United States Patent [19]

Jung

[11] Patent Number: 5,754,237
[45] Date of Patent: May 19, 1998

[54] METHOD FOR DETERMINING MOTION VECTORS USING A HIERARCHICAL MOTION ESTIMATION

[75] Inventor: Hae-Mook Jung, Seoul, Rep. of Korea

[73] Assignee: Daewoo Electronics Co., Ltd., Seoul, Rep. of Korea

[21] Appl. No.: 407,090

[22] Filed: Mar. 20, 1995

[51] Int. Cl.$^6$ ................................................. H04N 7/36
[52] U.S. Cl. ...................................... 348/413; 348/416
[58] Field of Search .................................. 348/413, 412, 348/411, 420, 409, 415, 416, 699; 382/236, 238, 240

[56] References Cited

U.S. PATENT DOCUMENTS

| | | | |
|---|---|---|---|
| 4,980,764 | 12/1990 | Henot. | |
| 5,351,095 | 9/1994 | Kerdranvat | 348/413 |
| 5,510,856 | 4/1996 | Jung | 348/411 |
| 5,537,155 | 7/1996 | O'Connell et al. | 348/699 |

FOREIGN PATENT DOCUMENTS

| | | |
|---|---|---|
| A-0 397 206 | 11/1990 | European Pat. Off. |
| A-0 538 667 | 4/1993 | European Pat. Off. |
| A-01 179584 | 7/1989 | Japan. |
| A-05 328334 | 12/1993 | Japan. |

OTHER PUBLICATIONS

J.R. Jain et al, "Displacement Measurement and Its Application in Interframe Image Coding", IEEE Transactions on Communications COM-29, No. 12 (Dec. 1981), pp. 1799–1808.

Primary Examiner—Amelia Au
Attorney, Agent, or Firm—Anderson, Kill & Olick, P.C.

[57] ABSTRACT

A method for determining motion vectors by employing a multi-tier hierarchical motion estimation comprises (a) motion-estimating each of the hierarchical search blocks of a processing block with respect to a corresponding hierarchical search region to thereby provide motion vectors and minimum error functions corresponding to hierarchical search blocks, (b) comparing the minimum error functions with a predetermined threshold, (c) determining a search block having a least minimum error function among the hierarchical search blocks; and (d) if minimum error functions of one or more search blocks are smaller than the predetermined threshold, determining as a motion vector of the processing block, a motion vector corresponding to a search block of a highest hierarchy among said one or more search blocks and if none of the minimum error functions are smaller than the predetermined threshold, determining a motion vector corresponding to the search block determined in said step (c) as a motion vector of the processing block.

11 Claims, 4 Drawing Sheets

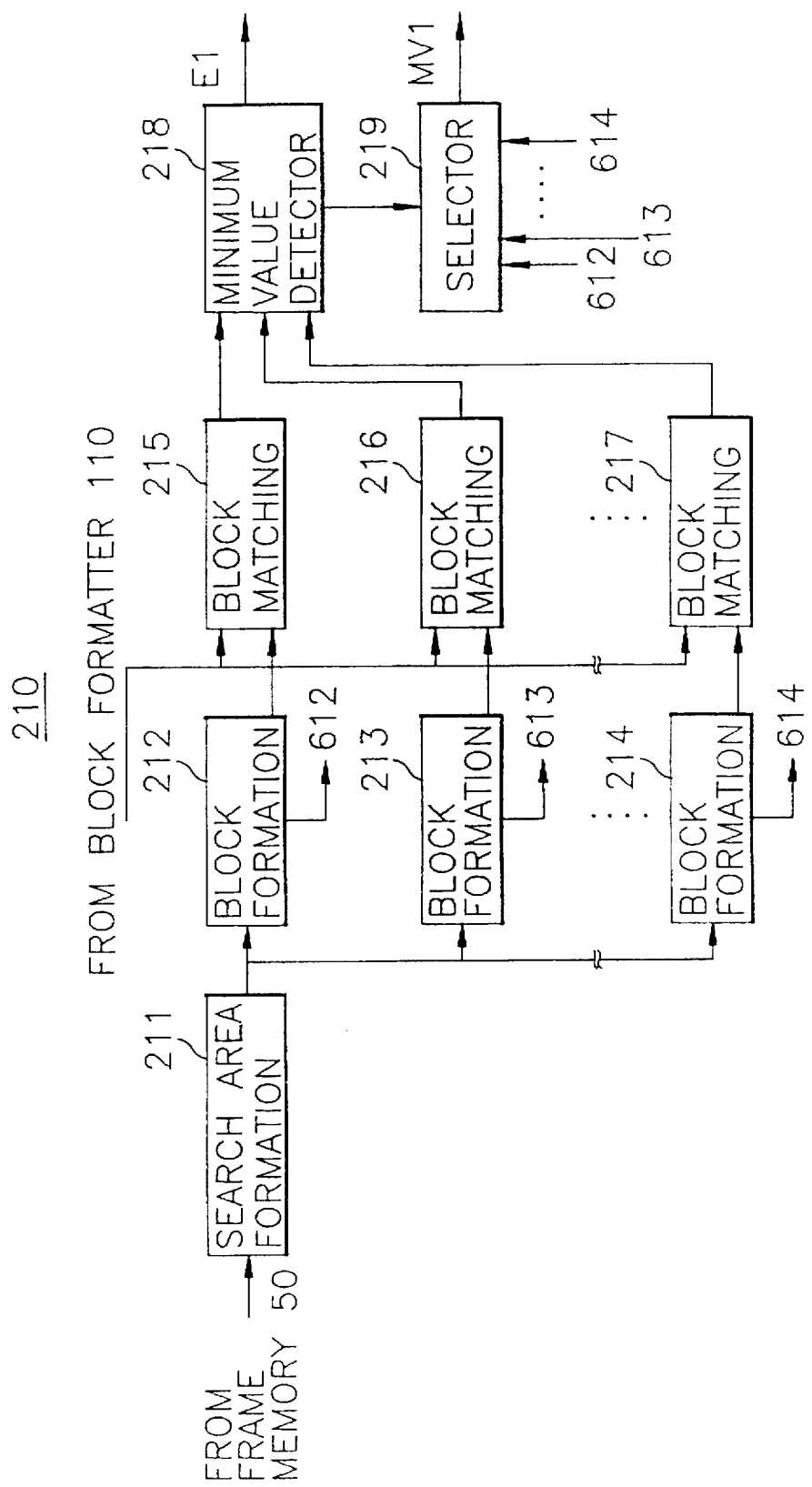

METHOD FOR DETERMINING MOTION VECTORS USING A HIERARCHICAL MOTION ESTIMATION

FIELD OF THE INVENTION

The present invention relates to a method for detecting motion vectors; and, more particularly, to an improved method for determining motion vectors from two successive video frames through the use of a hierarchical motion estimation approach.

DESCRIPTION OF THE PRIOR ART

In various electronic/electrical applications such as high definition television and video telephone systems, an image signal may need be transmitted in a digitized form. When the image signal is expressed in a digitized form, there is bound to occur a substantial amount of digital data. Since, however, the available frequency bandwidth of a conventional transmission channel is limited, in order to transmit the image signal therethrough, it is inevitable to compress or reduce the volume of the transmission data. Among various video compression techniques, a motion compensated interframe coding technique, which utilizes temporal redundancies of the video signals between two adjacent video frames for the compression of the signals, is known to be one of the more effective compression techniques.

In the motion compensated interframe coding scheme, current frame data is predicted from previous frame data based on an estimation of a motion between the current and the previous frames. Such estimated motion may be described in terms of two dimensional motion vectors representing the displacement of pixels between the previous and the current frames. One of the motion vector estimation schemes which have been proposed in the art is a block matching algorithm (see, e.g., J. R. Jain et al., "Displacement Measurement and Its Application in Interframe Image Coding", *IEEE Transactions on Communications COM-29*, No. 12 (December 1981)).

According to the block matching algorithm, a current frame is divided into a plurality of equal-sized search blocks. The size of a search block typically ranges between 8×8 and 32×32 pixels. To determine a motion vector for a search block in the current frame, a similarity calculation is performed between the search block of the current frame and each of a multiplicity of equal-sized candidate blocks included in a generally larger search region within a previous frame. An error function such as the mean absolute error or mean square error is used to carry out a similarity measurement between the search block of the current frame and each of the candidate blocks in the search region. And a motion vector, by definition, represents the displacement between the search block and a best matching block, i.e., a candidate block which yields a minimum "error" or difference.

However, in this block matching motion estimation approach employing a search block of a fixed size, if the size of the search block is relatively large, a same motion vector may be allocated to all pixels in the search block, which do not move in a same way, to thereby lower the overall picture quality.

SUMMARY OF THE INVENTION

It is, therefore, a primary object of the invention to provide an improved method capable of precisely detecting motion vectors from two successive video frames through the use of a hierarchical motion estimation approach.

In accordance with the invention, there is provided a method for determining a motion vector for each processing block in a current frame through the use of a multi-tier hierarchical motion estimation employing the current frame and a previous frame, wherein the current frame is divided into a number of processing blocks of an identical size, each of the processing blocks having M hierarchical search blocks which M being an integer larger than 1, a size of a search block of a hierarchy being greater than that of a search block of a lower hierarchy; and the previous frame is divided into a plurality of search regions corresponding to the hierarchical search blocks, each of the search regions having a multiplicity of candidate blocks, each of the candidate blocks having a size identical to that of its corresponding hierarchical search block, which comprises the steps of:

(a) motion-estimating each of the hierarchical search blocks of a processing block with respect to a corresponding hierarchical search region to thereby provide motion vectors and minimum error functions corresponding to hierarchical search blocks, each of the motion vectors representing a displacement of pixels between each of the hierarchical search blocks and a candidate block which yields a minimum error function of a corresponding hierarchy;

(b) comparing the minimum error functions with a predetermined threshold;

(c) determining a search block having a least minimum error function among the hierarchical search blocks; and (d) if minimum error functions of one or more search blocks are smaller than the predetermined threshold, determining as a motion vector of the processing block, a motion vector corresponding to a search block of a highest hierarchy among said one or more search blocks and if none of the minimum error functions are smaller than the predetermined threshold, determining a motion vector corresponding to the search block determined in said step (c) as a motion vector of the processing block.

BRIEF DESCRIPTION OF THE DRAWINGS

The above and other objects and features of the present invention will become apparent from the following description of preferred embodiments given in conjunction with the accompanying drawings, in which:

FIG. 2 depicts a detailed block diagram representing one of error generators shown in FIG. 1.

DETAILED DESCRIPTION OF THE PREFERRED EMBODIMENTS

Figure 1:
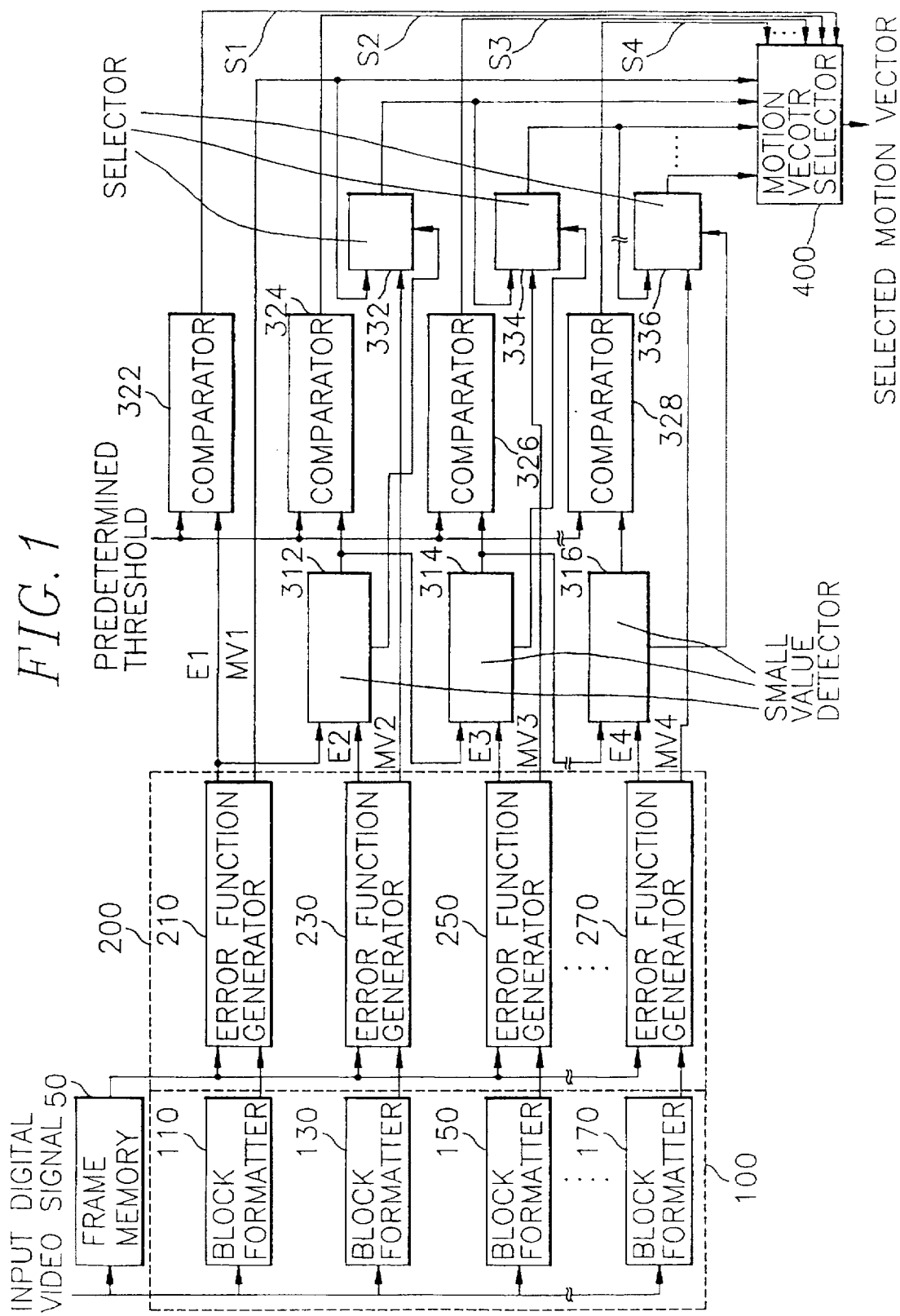
FIG. 1 is a block diagram of the inventive apparatus for determining motion vectors between a current frame and a previous frame of video signals.
Figure 3A:
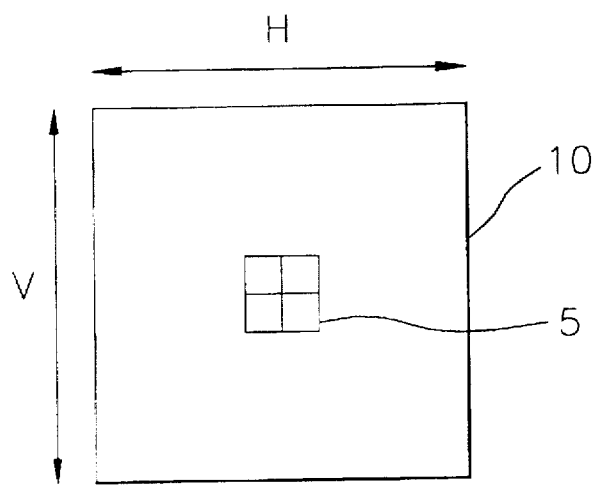
FIGS. 3A–3D illustrate exemplary hierarchical search blocks.
Figure 3B:
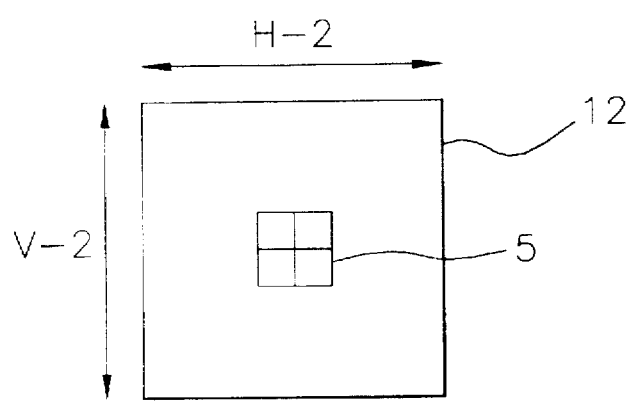
Figure 3C:
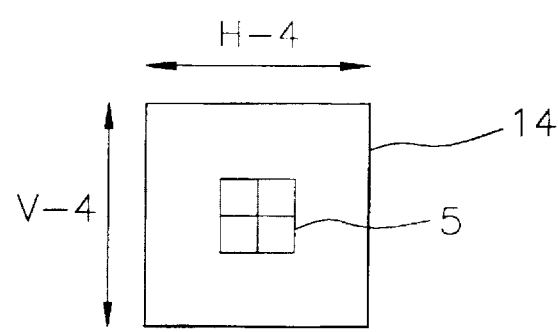
Figure 3D:
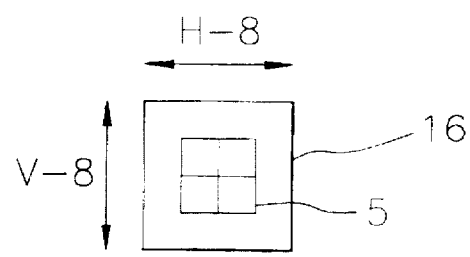

Referring to FIG. 1, there is shown a block diagram of the inventive apparatus for determining a motion vector for each of a plurality of processing blocks in a current frame by employing a multi-tier hierarchical motion estimation approach. Each processing block with the size of P×Q, e.g., 2×2, pixels has hierarchical search blocks in a current frame.

The current frame data is fed as an input digital video signal to a frame memory 50 and a block formation section 100 for generating hierarchical search blocks. The block formation section 100 serves to generate the hierarchical search blocks for each processing block, wherein the processing block is located at the center of the search blocks. A search block of a hierarchy is greater than a search block of its lower hierarchy by 2N pixels vertically and horizontally, N being an integer larger than 0, e.g., 1; and a search block of a lowest hierarchy is equal to or greater than the processing block.

As shown in FIG. 1, the block formation section 100 includes M number of, e.g. 4, block formatters, e.g., 110 to 170. At the block formatters 110, 130, 150 and 170, hierarchical search blocks for each of the processing blocks are generated, and the sizes of the search blocks vary in 2N-pixel steps from 2N to 2N(M−1) in its horizontal and vertical directions, M being an integer larger than 1. More specifically, a first block formatter 110 generates search blocks of a highest hierarchy having a size of H×V pixels; a second block formatter 130 generates search blocks of a lower hierarchy having a size of (H−2N)×(V−2N), e.g., (H−2)×(V−2), pixels; a third block formatter 150 generates search blocks of a further lower hierarchy having a size of (H−4N)×(V−4N), e.g., (H−4)×(V−4), pixels; and a last block formatter 170 generates search blocks of a lowest hierarchy having a size of (H−2N(M−1))×(V−2N(M−1)), e.g., (H−2(M−1))×(V−2(M−1)), pixels.

In FIGS. 3A–3D, the hierarchical search blocks generated from the block formatters 110 to 170 are exemplarily illustrated, the hierarchical search blocks being used in a preferred embodiment of the present invention. For the sake of illustration, it is assumed that H and V are an equal number 16 for each search block of pixels in the current frame.

As shown in FIGS. 3A–3D, the block formatter 110 forms a search block 10 with the size of H×V, i.e., 16×16, pixels, wherein the search block 10 is set up by using a processing block 5 as a reference, the processing block 5 being located at the center of the search block 10. Similarly, the block formatter 130 sets up a reduced search block 12 with the size of (H−2)×(V−2), i.e., 14×14 pixels; the block formatter 150 sets up a further reduced search block 14 with the size of (H−4)×(V−4), i.e., 12×12 pixels; and the last block formatter 170 generates a smallest search block 16 of the lowest hierarchical search block with the size of (H−8)×(V−8), i.e., 8×8 pixels by using the processing block 5 as a reference, the processing block 5 being located at the center of the respective reduced search blocks 12, 14 and 16.

Referring back to FIG. 1, the hierarchical search blocks generated from the block formatters 110 to 170 are fed to a motion estimation unit 200 which includes a number of error function calculators 210 to 270. Previous frame data from the frame memory 50 is also supplied to the motion estimation unit 200. In each of the error function calculators 210 to 270 included within the motion estimation unit 200, the previous frame data from the frame memory 50 and the current frame data are processed to calculate and estimate a motion vector which represents the displacement between a search block of the current frame and a candidate block, which yields the minimum error function.

The error function calculators 210, 230, 250 and 270 are made of substantially identical elements, each element serving a same function. Accordingly, the operation of each error function calculator 210, 230, 250 or 270 is essentially identical; and, therefore, the operation of the error function calculator 210 will be representatively described in detail with reference to FIG. 2, wherein there is shown a detailed block diagram of the error function calculator 210.

As shown in FIG. 2, the previous frame data provided from the frame memory 50 shown in FIG. 1 is supplied to a search area formation section 211. The search area formation section 211 defines search regions of the previous frame with an equal size, the size of each search region being generally larger than that of the search block.

After the search region is determined at the search area formation section 211, the search region data is applied to a plurality of block formation sections, e.g., 212 to 214. At each block formation section, a candidate block of H×V, i.e., 16×16, pixels is generated from the search region and the relative displacements of the candidate blocks from the location of the search block in the current frame are outputted as displacement vectors, e.g., 612 to 614, of the candidate blocks. All the possible candidate blocks with the size of H×V pixels are formed within the determined search region, and a displacement vector corresponding to each candidate block is obtained.

The pixel data of each candidate block is outputted from each of the candidate block formation sections 212 to 214 to each of block matching sections 215 to 217. The search block data having the size of H×V pixels is also provided from the block formatter 110 shown in FIG. 1 to each of the block matching sections 215 to 217. At each of the block matching sections, an error function, e.g., mean absolute error which corresponds to the mean value of the absolute differences between the pixels in the search block and the candidate block, is calculated between the search block from the block formatter 110 and the candidate blocks from the respective candidate block formation sections 212 to 214. A comparison of, e.g., light intensity or luminance is performed between corresponding pixels in the search block and each of the candidate blocks to yield an error function for said each of the candidate blocks. The error function will indicate the degree of similarity between the search block and said each candidate block.

All the error functions from the block matching sections 215 to 217 are applied to a minimum value detector 218. The minimum value detector 218 compares the error functions and selects the error function which has a smallest value.

The minimum value detector 218 outputs the signal which indicates the block corresponding to the minimum error function to a selector 219. The displacement vectors 612 to 614 obtained from the block formation sections 212 to 214 are also applied to the selector 219. The selector 219 then chooses the displacement vector of the candidate block, which corresponds to the minimum error function, as the motion vector for said search block with the size of H×V pixels. The determined motion vector is outputted as a first hierarchical motion vector MV1 to a motion vector selector 400 and a selector 332, shown in FIG. 1. The minimum error function selected by the minimum value detector 218 is outputted as a first hierarchical error function E1 to a small value detector 312 and a comparator 322, shown in FIG. 1.

Similarly, each of the error function generators 230 to 270 shown in FIG. 1 compares corresponding search block with each candidate block included in its corresponding search region of the previous frame by using an error function such as mean absolute error. Thereafter, each of the error function generators 230 to 270 develops error functions for each search block at each hierarchy level. The error functions at each hierarchy level are processed to yield the minimum error function for each search block at each hierarchy; and the displacement vector corresponding to the minimum error function is selected as the motion vector of the search block. The minimum error functions from each of the error function generators 230 to 270 are applied to small value detectors 312 to 316 as the second hierarchical, the third hierarchical and the last hierarchical error functions E2 to E4, respectively; and each of the motion vectors for each search block in each hierarchy is applied to selectors 332 to 336 as the second hierarchical, the third hierarchical and the last hierarchical motion vectors MV2 to MV4, respectively.

The small value detector 312 outputs a smaller error function between its two inputs, i.e., the first and the second hierarchical error functions E1, E2, to the comparator 324 and a next small value detector 314, and generates a control signal which indicates the hierarchical motion vector corresponding to the smaller error function to the selector 332. The next small value detector 314 outputs a smaller error function between its two inputs, i.e., the output from the small value detector 312 and the third hierarchical error function E3 to the comparator 326 and the next stage small value detector, and generates a control signal which indicates the hierarchical motion vector corresponding to the smaller error function outputted therefrom to the selector 334. And, the last small value detector 316 outputs the smaller error function between its two inputs, i.e., the output of the prior stage small value detector and the last hierarchical error function E4 to the comparator 328, and generates a control signal which indicates the hierarchical motion vector corresponding to the smaller error function provided therefrom to the selector 336.

Each of the comparators 322 to 328 compares its two inputs, i.e., a predetermined threshold and the hierarchical error function applied thereto; and generates a logic high or logic low selection signal S1 to S4 to the motion vector selector 400. That is, each comparator generates a logic high selection signal if the predetermined threshold is larger than the respective hierarchical error function; otherwise, it generates a logic low selection signal to the motion vector selector 400.

The comparator 322 compares the predetermined threshold with the first hierarchical error function E1 and generates a logic high selection signal if the predetermined threshold is larger than E1; otherwise, it generates a logic low selection signal to the motion vector selector 400. Similarly, each of the comparators 324 to 328 compares the predetermined threshold with the output of each corresponding small value detector 312 to 316, and generates a logic high selection signal if the predetermined threshold is larger than the output of said each corresponding small value detector; otherwise, generates a logic low selection signal to the motion vector selector 400, respectively.

In accordance with the present invention, if S1 is logic high, the selection signals S2 to S4 become logic high. If S1 is logic low and S2 is logic high, S3 to S4 become logic high. In other words, if a selection signal corresponding to a hierarchy is logic high, the selection signal(s) corresponding to the lower hierarchy is logic high.

Each of the selectors 332 to 336 selects one of the two hierarchical motion vectors inputted thereto, in response to the control signals provided from the respective small value detectors 312 to 316. That is, the selector 332 selects one of its two inputs, i.e., the first and second hierarchical motion vectors MV1, MV2, in response to the control signal provided from the small value detector 312; and provides the selected motion vector to the selector 334 and the motion vector selector 400. The selector 334 selects one of its two inputs, i.e., the output from the selector 332 and the third hierarchical motion vector MV3, in response to the control signal provided from the small value detector 314; and provides the selected motion vector to the motion vector selector 400 and a next stage selector. And, the last selector 336 selects one of its two inputs, i.e., the output from a prior stage selector and the last hierarchical motion vector MV4, in response to the control signal generated from the last small value detector 316; and provides the selected motion vector to the motion vector selector 400.

The motion vector selector 400 takes the selection signals S1 to S4 as inputs in order to select one of said motion vectors applied thereto as the motion vector for the processing block.

If S1 is logic high, the motion vector selector 400 selects MV1 as the motion vector for the processing block regardless of the other selection signals. If S1 is logic low and S2 is logic high, the motion vector selector 400 selects the motion vector supplied from the selector 332 as the motion vector for the processing block. In this manner, the motion vector selector 400 selects as the motion vector of the processing block a motion vector corresponding to the highest hierarchical selection signal among the logic high selection signals applied thereto. If all of the selection signals S1 to S4 are logic low, the motion vector selector 400 selects the motion vector provided from the last selector 336 as the motion vector for the processing block, the motion vector selected by the last selector 336 corresponding to the hierarchical error function which has the smallest value.

While the present invention has been described with reference to the particular embodiments, it will be apparent to those skilled in the art that various changes and modifications may be made without departing from the spirit and scope of the invention as defined in the following claims.

What is claimed is:

1. A method for determining a motion vector for each processing block in a current frame through the use of a multi-tier hierarchical motion estimation employing the current frame and a previous frame, wherein the current frame is divided into a number of processing blocks of an identical size, each of the processing blocks mapping into M hierarchical search blocks, M being an integer larger than 1, each hierarchical search block containing the corresponding processing block located at the center of said each hierarchical search block and a size of a search block of a hierarchy being greater than that of a search block of a lower hierarchy; and the previous frame is divided into a plurality of search regions corresponding to the hierarchical search blocks, each of the search regions having a multiplicity of candidate blocks, each of the candidate blocks having a size identical to that of its corresponding hierarchical search block, which comprises the steps of:

(a) motion-estimating each of the hierarchical search blocks of a processing block with respect to a corresponding hierarchical search region to thereby provide motion vectors and minimum error functions corresponding to hierarchical search blocks, each of the motion vectors representing a displacement of pixels between each of the hierarchical search blocks and a candidate block which yields a minimum error function of a corresponding hierarchy;

(b) comparing the minimum error functions with a predetermined threshold;

(c) determining a search block having a least minimum error function among the hierarchical search blocks; and (d) if minimum error functions of one or more search blocks are smaller than the predetermined threshold, determining as a motion vector of the processing block, a motion vector corresponding to a search block of a highest hierarchy among said one or more search blocks and if none of the minimum error functions are smaller than the predetermined threshold, determining a motion vector corresponding to the search block determined in said step (c) as a motion vector of the processing block.

2. A method for determining a set of motion vectors for a set of processing blocks in a current frame through the use of a multi-tier hierarchical motion estimation employing the current frame and a previous frame, wherein the current frame is divided into the set of processing blocks of an identical size, which comprises the steps of:

(a) sequentially generating each processing block as a target processing block;

(b) providing M number of hierarchical search blocks for the target processing block, wherein each hierarchical search block contains the target processing block located at the center of said each hierarchical search block and a size of a search block of a hierarchy being greater than that of a search block of a lower hierarchy, M being an integer larger than 1;

(c) providing M number of search regions corresponding to the hierarchical search blocks based on the previous frame, wherein each of the search regions has a multiplicity of candidate blocks, each of the candidate blocks having a size identical to that of its corresponding hierarchical search block;

(d) motion-estimating each of the hierarchical search blocks of the target processing block with respect to a corresponding hierarchical search region to thereby provide motion vectors and minimum error functions corresponding to hierarchical search blocks, each of the motion vectors representing a displacement of pixels between each of the hierarchical search blocks and a candidate block which yields a minimum error function of a corresponding hierarchy;

(e) comparing each of the minimum error functions with a predetermined threshold and comparing the minimum error functions with one another; and (f) if minimum error functions of one search block is smaller than the predetermined threshold and has a smallest value, determining as a motion vector of the target processing block, a motion vector corresponding to said one search block; if minimum error functions of one or more search blocks are smaller than the predetermined threshold, determining as a motion vector of the target processing block, a motion vector corresponding to a search block of a highest hierarchy among said one or more search blocks; and if none of the minimum error functions are smaller than the predetermined threshold, determining a motion vector corresponding to the search block having a minimum error function denoting the smallest value as a motion vector of the target processing block.

3. The method as recited in claim 2, wherein the sizes of the hierarchical search blocks vary in 2N-pixel steps from 2N to 2N(M−1) in the target processing block's horizontal and vertical directions, N being an integer larger than zero.

4. The method as recited in claim 3, wherein the N is 1.

5. The method as recited in claim 4, wherein the size of each of the processing block is 2×2 pixels.

6. The method as recited in claim 5, wherein the size of a search block of the lowest hierarchy is identical to that of the target processing block.

7. An apparatus for determining a set of motion vectors for a set of processing blocks in a current frame through the use of a multi-tier hierarchical motion estimation employing the current frame and a previous frame, wherein the current frame is divided into the set of processing blocks of an identical size, which comprises:

means for sequentially generating each processing block as a target processing block;

means for providing M number of hierarchical search blocks for the target processing block, wherein each hierarchical search block contains the target processing block located at the center of said each hierarchical search block and a size of a search block of a hierarchy being greater than that of a search block of a lower hierarchy, M being an integer larger than 1;

means for providing M number of search regions corresponding to the hierarchical search blocks based on the previous frame, wherein each of the search regions has a multiplicity of candidate blocks, each of the candidate blocks having a size identical to that of its corresponding hierarchical search block;

means for motion-estimating each of the hierarchical search blocks of the target processing block with respect to a corresponding hierarchical search region to thereby provide motion vectors and minimum error functions corresponding to hierarchical search blocks, each of the motion vectors representing a displacement of pixels between each of the hierarchical search blocks and a candidate block which yields a minimum error function of a corresponding hierarchy;

means for comparing each of the minimum error functions with a predetermined threshold and comparing the minimum error functions with one another; and means, if minimum error functions of one search block is smaller than the predetermined threshold and has a smallest value, for determining as a motion vector of the target processing block, a motion vector corresponding to said one search block; if minimum error functions of one or more search blocks are smaller than the predetermined threshold, for determining as a motion vector of the target processing block, a motion vector corresponding to a search block of a highest hierarchy among said one or more search blocks; and if none of the minimum error functions are smaller than the predetermined threshold, for determining a motion vector corresponding to the search block having a minimum error function denoting the smallest value as a motion vector of the target processing block.

8. The apparatus as recited in claim 7, wherein the sizes of the hierarchical search blocks vary in 2N-pixel steps from 2N to 2N(M−1) in the target processing block's horizontal and vertical directions, N being an integer larger than zero.

9. The apparatus as recited in claim 8, wherein the N is 1.

10. The apparatus as recited in claim 9, wherein the size of each of the processing block is 2×2 pixels.

11. The apparatus as recited in claim 10, wherein the size of a search block of the lowest hierarchy is identical to that of the target processing block.

* * * * *